(12) United States Patent
Ito et al.

(10) Patent No.: US 6,488,753 B1
(45) Date of Patent: Dec. 3, 2002

(54) AQUEOUS PIGMENT DISPERSION WATER-BASE INK COMPOSITION AND RECORDING METHOD USING THE INK COMPOSITION

(75) Inventors: Hiroshi Ito, Nagano-Ken (JP); Masayuki Momose, Nagano-Ken (JP); Hiroko Hayashi, Nagano-Ken (JP); Sohko Ito, Osaku-Fu (JP)

(73) Assignees: Seiko Epson Corporation, Tokyo (JP); Orient Chemical Industries, Ltd., Osaka-Fu (JP)

( * ) Notice: Subject to any disclaimer, the term of this patent is extended or adjusted under 35 U.S.C. 154(b) by 0 days.

(21) Appl. No.: 09/521,572

(22) Filed: Mar. 9, 2000

(30) Foreign Application Priority Data

| Mar. 10, 1999 | (JP) | 11-063519 |
| Mar. 10, 1999 | (JP) | 11-063520 |
| Mar. 10, 1999 | (JP) | 11-063522 |
| Mar. 10, 1999 | (JP) | 11-063523 |
| Mar. 10, 1999 | (JP) | 11-063523 |

(51) Int. Cl.[7] ............................................. C09D 11/00
(52) U.S. Cl. ................. 106/31.9; 106/31.86; 106/31.89
(58) Field of Search ..................... 106/31.9, 31.86, 106/31.89, 472, 478

(56) References Cited

U.S. PATENT DOCUMENTS

| 5,718,746 A | * | 2/1998 | Nagasawa et al. | 106/31.9 |
| 5,746,818 A | * | 5/1998 | Yatake | 106/31.86 |
| 5,846,307 A | * | 12/1998 | Nagasawa et al. | 106/31.75 |
| 5,968,244 A | * | 10/1999 | Ueda et al. | 106/31.86 |
| 6,099,632 A | * | 8/2000 | Nagasawa et al. | 106/31.9 |

FOREIGN PATENT DOCUMENTS

| EP | 0688836 | 12/1995 |
| EP | 0733682 | 3/1996 |
| EP | 0802247 | 4/1997 |
| EP | 0842994 | 11/1997 |

* cited by examiner

*Primary Examiner*—Helene Klemanski
*Assistant Examiner*—Veronica F. Faison
(74) *Attorney, Agent, or Firm*—Ladas & Parry (57) ABSTRACT

Disclosed are an aqueous pigment dispersion and an ink composition which can realize high print density. The aqueous pigment dispersion comprises at least water and a surface-modified carbon black, the surface-modified carbon black being dispersible and/or dissolvable in water without any dispersant and having a hydrophilic functional group content/specific surface area value of 5 to 30 $\mu mol/m^2$.

18 Claims, 1 Drawing Sheet

FIG. 1

AQUEOUS PIGMENT DISPERSION WATER-BASE INK COMPOSITION AND RECORDING METHOD USING THE INK COMPOSITION

BACKGROUND OF THE INVENTION

1. Field of the Invention

The present invention relates to an aqueous pigment dispersion containing a surface-modified carbon black, and a water-base ink composition comprising this aqueous pigment dispersion.

2. Background Art

Water-soluble dyes have hitherto been used in recording liquids for water-base writing utensils and ink jet printers. On the other hand, in recent years, pigments, such as carbon blacks, have become used as colorants from the viewpoint of improving image quality and fastness properties of records. For example, Japanese Patent Laid-Open Nos. 6074/1989 and 31881/1989 describe water-base pigment inks wherein carbon black was dispersed with the aid of a surfactant or a polymeric dispersant.

In these inks, however, increasing the content of the colorant in the ink to enhance the print density of records has sometimes resulted in gretely increased viscosity of the ink. The use of an excessive amount of a surfactant or a polymeric dispersant is necessary to stably disperse carbon black in the ink. The presence of the surfactant and the polymeric dispersant, however, bubbles or deteriorated antifoaming properties, and, particularly in ink jet recording, may deteriorate the printing stability.

In order to solve these problems, Japanese Patent Laid-Open Nos. 3498/1996 and 120958/1998 describe surface-modified carbon black dispersions wherein surface active hydrogen or a salt thereof has been introduced in a given amount or larger into carbon black to permit the carbon black to be solely dispersed in an aqueous solvent without any surfactant or polymeric dispersant. Japanese Patent Laid-Open No. 110127/1998 describes a method for introducing sulfone groups into carbon black. Further, Japanese Patent Laid-Open No. 95941/1998 proposes an ink for ink jet recording, comprising the above surface-modified carbon black and a glycol ether.

SUMMARY OF THE INVENTION

The present inventors have now found that a surface-modified carbon black having a hydrophilic functional group content/specific surface area value in a specific range can realize printing at higher print density and can provide ink compositions which yield records having higher image quality. The present invention has been made based on such finding.

Accordingly, it is an object of the present invention to provide an aqueous pigment dispersion and a water-base ink composition which can realize-printing at high print density and can yield records having higher image quality.

According to one aspect of the present invention, there is provided an aqueous pigment dispersion comprising at least water and a surface-modified carbon black, the surface-modified carbon black being dispersible and/or dissolvable in water without any dispersant and having a hydrophilic functional group content/specific surface area value of 5 to 30 $\mu$mol/m$^2$.

According to another aspect of the present invention, there is provided a water-base ink composition comprising at least the above aqueous pigment dispersion.

DESCRIPTION OF THE PREFERRED EMBODIMENTS

Aqueous Pigment Dispersion

The aqueous pigment dispersion according to the present invention comprises at least water and a surface-modified carbon black. The surface-modified carbon black is dispersible and/or dissolvable in water without any dispersant. Furthermore, it has a hydrophilic functional group content/specific surface area value of 5 to 30 $\mu$mol/m$^2$.

According to the surface-modified carbon black of the present invention, hydrophilic functional groups are introduced in a large amount into carbon black to modify the surface of the carbon black and consequently to impart hydrophilic nature to the carbon black per se. It is considered that, by virtue of this, just like the dissolution of a water-soluble dye in the form of single molecules in water, the surface-modified carbon black can be brought to such particle diameters that enable the dispersion of the carbon black (preferably minimum particle diameter), and thus can be dispersed in water without the aid of a dispersant. This type of surface-modified carbon black is generally called "self-dispersible carbon black." This carbon black is used in the present invention.

The use of the aqueous pigment dispersion according to the present invention enables the preparation of ink compositions without any dispersant. Therefore, increasing the concentration of the carbon black in the ink composition causes no signficant change in viscosity, and the carbon black can be stably present in high concentration in the ink composition. Thus, printed images having high density can be realized. Further, the aqueous pigment dispersion according to the present invention has a specific hydrophilic functional group content/specific surface area value. The use of the specific surface-modified carbon black is advantageous in that a signficant improvement in image quality can be realized over carbon black not satisfying the requirements specified in the present invention.

According to the present invention, the surface-modified carbon black refers to a carbon black wherein hydrophilic functional groups or salts thereof, such as carboxyl groups, carbonyl groups, hydroxyl groups, sulfone groups, phosphoric acid groups, or quaternary ammonium salt, have been bonded on the surface of carbon black as a pigment either directly or through an alkyl group, an alkyl ether group or an aryl group.

According to the present invention, "dispersible and/or dissolvable in water without any dispersant" refers to that the carbon black can stably exist in diameters of particles (preferably minimum particle diameter) which can be dispersed in water without the aid of any dispersant. The diameter of particles, which can be dispersed in water, refers to a particle diameter such that the size of the particles no longer can be reduced by prolonging the dispersion time.

In the surface-modified carbon black contained in the aqueous pigment dispersion of the present invention, a value obtained by dividing the hydrophilic functional group content ($\mu$mol/g) by the specific surface area (m$^2$/g) of carbon black, that is, the hydrophilic functional group content/specific surface area value is in the range of 5 to 30 $\mu$mol/m$^2$, preferably in the range of 7.5 to 15 $\mu$mol/m$^2$. When the aqueous pigment dispersion is used in a water-base ink for writing utensils or ink jet recording, the hydrophilic functional group content/specific surface area value is particularly preferably in the range of 7.5 to 15 $\mu mol/m^2$. An ink composition using an aqueous pigment dispersion containing a surface-modified carbon black having the above hydrophilic functional group content specific surface area value range can realize higher print density and good dispersion stability and storage stability.

The hydrophilic functional group content referred to herein is the content of hydrophilic functional groups, such as carboxyl, carbonyl, and hydroxyl groups, and may generally be determined by a vacuum pyrolysis gas method used in the measurement of the volatile content of carbon black. The vacuum pyrolysis gas method is described in Journal of The Chemical Society of Japan, Vol. 88, No. 3, 69–74 (1967). This method will be described in more detail.

Figure 1:
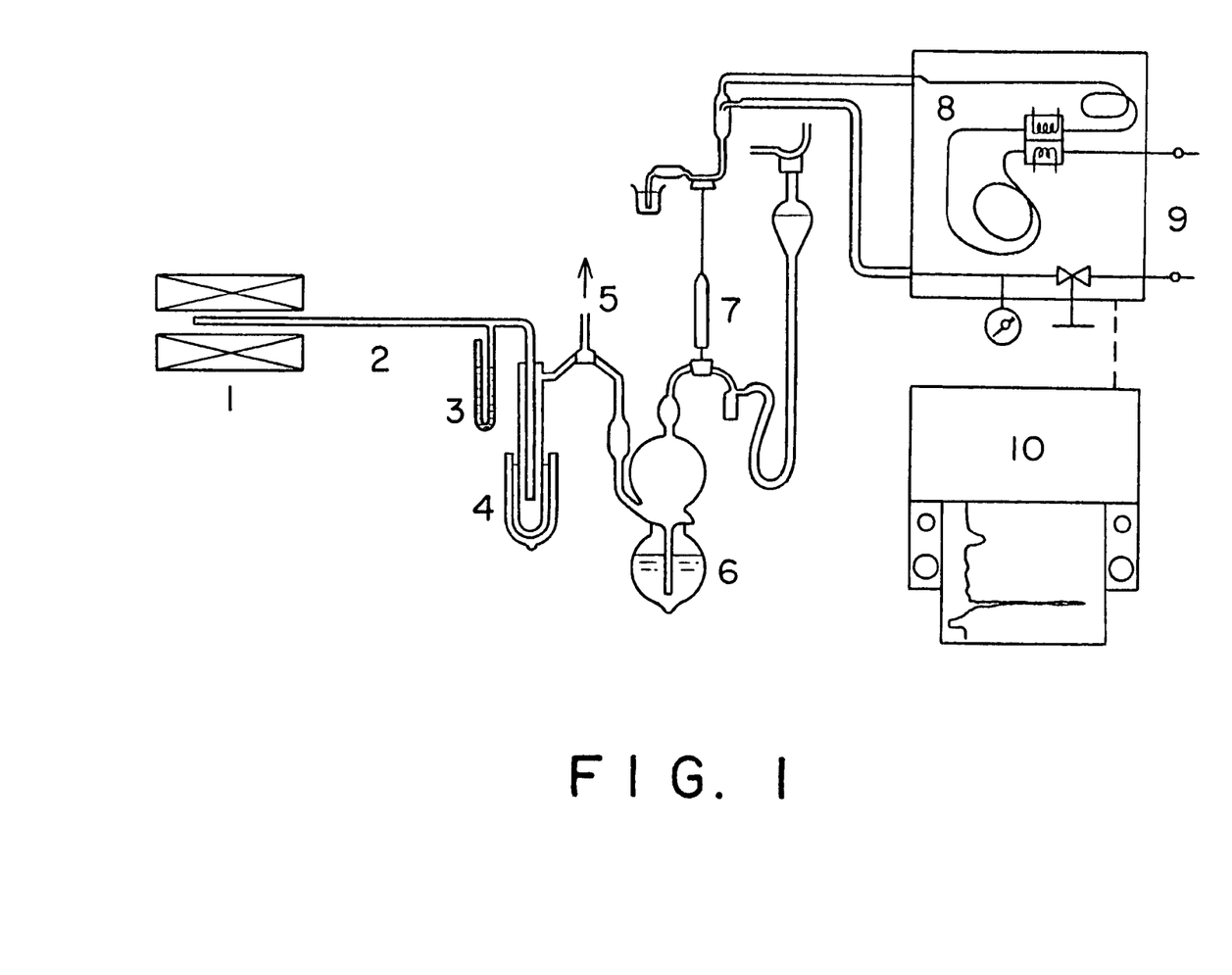
FIG. 1 is a schematic diagram showing a vacuum pyrolysis apparatus for measuring the content of hydrophilic functional groups in a surface-modified carbon black.

The content of hydrophilic functional groups in the surface-modified carbon black is measured with a vacuum pyrolysis apparatus provided with an electric furnace and a gas chromatograph as shown in FIG. 1. The gas chromatograph used is of an intermediate cell type. The first-stage column is packed with silica gel, and the second-stage column is packed with Molecular Sieve 13X. Argon is used as a carrier gas. Carbon black (0.1 to 0.5 g) as a sample is weighed, placed in a quartz tube, loaded into an electric oven, and then pretreated by evacuation at 120° C. for 2 hr to remove adsorbed water and air. Next, a temperature controller in the electric oven is set to 200° C., and the system is kept at this temperature for one hr, during which time evolved gas is collected. The gas is gas chromatographed to analyze the composition. Immediately after that, the temperature is set to 300° C., and gas evolved during next one hr is collected and analyzed. Thereafter, gas evolved during each one hr at 400° C., 500° C., 600° C., 700° C., 800° C., 900° C., and 1000° C. in that order is collected, and then gas chromatographed to analyze the composition. The gas evolved is composed mainly of carbon monoxide and carbon dioxide. The content of hydrophilic functional groups in the surface-modified carbon black is calculated based on data obtained about the composition of gas evolved under each temperature condition.

The content of hydrophilic functional groups in the surface-modified carbon black according to the present invention is preferably not less than 1.5 mmol/g. When the hydrophilic functional group content is the above value range, the pigment dispersion can advantageously ensure good dispersion stability and storage stability.

According to the present invention, the specific surface area ($m^2/g$) may be determined by adsorbing a gas on carbon black and calculating the surface area of the carbon black from the amount of the adsorption and the molecular sectional area in the adsorbed state. This method is known as "nitrogen absorption method." According to the present invention, the specific surface area of carbon black embraces both the specific surface area of a surface-modified carbon black and the specific surface area of surface-unmodified carbon black as a starting material for the surface-modified carbon black. Further, it is estimated that the specific surface area of the surface-modified carbon black is substantially identical to that of the surface-unmodified carbon black. That is, the carbon black after the surface modification would have substantially the same specific surface area as the carbon black before the surface modification.

Any carbon black generally available as carbon black for colors may be usable as the carbon black in the present invention. More specifically, carbon blacks usable in the present invention may be classified according to pH into acidic carbon blacks, neutral carbon blacks, and basic carbon blacks. Further, carbon blacks usable in the present invention may be classified according to production methods into furnace carbon blacks, channel carbon blacks, acetylene carbon blacks, and thermal carbon blacks.

According to a preferred embodiment of the present invention, the surface-modified carbon black is preferably one prepared by oxidizing the acidic carbon black among the above carbon blacks. In general, when carbon black is oxidized, the step of grinding a starting carbon black and the step of oxidizing the ground carbon black are carried out sequentially or substantially simultaneously. In this case, an oxidizing agent is required in both the steps. The acidic carbon black has on its surface a large amount of hydrophilic groups, such as carboxyl groups, and thus is well wetted by an aqueous medium and can be easily size reduced. This can eliminate the need to use any oxidizing agent at the time of size reduction. Therefore, the amount of the oxidizing agent used in the oxidation can be reduced. As a result, according to the present invention, the hydrophilic functional group content/specific surface area value of the surface-modified carbon black can be easily regulated, for example, to a range of 5 to 30 $\mu mol/m^2$. Further, according to the present invention, since the amount of the oxidizing agent can be reduced, the contemplated aqueous pigment dispersion can be produced at relatively low cost.

Specific examples of preferred acidic carbon blacks usable in the present invention include: #50, MA 8, and MA 100 which are carbon blacks manufactured by Mitsubishi Chemical Corporation; Color Black FW 1, Color Black FW 18, Color Black S170, and Special Black 250 which are carbon blacks manufactured by Degussa); Raven 3500, Raven 1080, and Raven C which are carbon blacks manufactured by Columbian Carbon Co., Ltd.; and Monarch 1300 and Regal 400R which are carbon blacks manufactured by Cabot Corporation.

According to a further preferred embodiment of the present invention, the surface-modified carbon black is one produced by oxidizing channel carbon black among the acidic carbon blacks described above. The use of the channel carbon black can provide aqueous pigment dispersions which can realize higher print density than the conventional aqueous pigment dispersion. The channel carbon black refers to a carbon black for colors produced by the channel method. In the channel method, a starting gas is burned in air, and the resultant flame is allowed to collide with a metallic surface, "called a channel," to produce carbon black. Natural gas is the most commonly used starting gas. Alternatively, vapor of a treated oil or a naphthalene oil may be used as the starting gas.

The reason why the use of the channel carbon black can provide aqueous pigment dispersions capable of realizing high print density is believed as follows. Specifically, in general, in the production of a surface-modified carbon black, the step of grinding a starting carbon black and the step of oxidizing the a ground carbon black are carried out sequentially or substantially simultaneously. In this case, an oxidizing agent is required in both the steps. The channel carbon black generally has high volatile content due to the presence of a large amount of hydrophilic groups on its surface. By virtue of this, the channel carbon black even in untreated state is well wetted by an aqueous medium and can be easily size reduced. This can eliminate the need to use any oxidizing agent at the time size reduction. Therefore, the amount of the oxidizing agent used in the oxidation can be reduced. As a result, aqueous pigment dispersions capable of realizing high print density can be produced.

Further, in general, in the case of the channel carbon black, the Japanese lacquer blackness of the pigment per se is higher than that of the furnace carbon black. Aqueous pigment dispersions containing the surface-modified carbon black reflect this high Japanese lacquer blackness, and, thus, it is considered that the print density can be further enhanced at the time of printing.

Furthermore, as compared with the furnace carbon black, the channel carbon black has, in many cases, smaller particle diameter and narrower particle diameter distribution and, hence, when the pigment dispersion was deposited onto recording media, can enhance the density of the carbon black particles on the recording media. Therefore, it is considered that the use of the channel carbon black can enhance the print density.

The channel carbon black is generally classified according to blackness into high-grade blackness channel black (HCC; high color channel), medium-grade blackness channel black (MCC; medium color channel), and regular blackness channel black (RCC; regular color channel). Further, the channel black may be classified according to ink properties into long flow channel (LFC; long flow channel) and medium flow channel (MFC; medium flow channel). All the carbon blacks falling within these categories may be used in the present invention.

Specific examples of channel carbon blacks suitable for use in the present invention include Color Black FW 200, Color Black FW 1, Color Black FW 18, Special Black 74, Special Black 6, Special Black 5, Color Black S 170, Color Black S 160, Printex U, and Printex V (tradenames; manufactured by Degussa).

The aqueous pigment dispersion according to the present invention may be produced by a production process comprising the steps of: grinding carbon black in an aqueous medium having a surface tension of not more than 50 mN/m; and oxidizing the carbon black in an aqueous medium to introduce hydrophilic functional groups into the carbon black to prepare an aqueous pigment dispersion containing a surface-modified carbon black. That is, the production process of the aqueous pigment dispersion according to the present invention comprises the step of grinding carbon black in an aqueous medium having a surface tension of not more than 50 mN/m. In general, in the oxidation of carbon black, the step of grinding a starting carbon black and the step of oxidizing the ground carbon black are carried out sequentially or substantially simultaneously. In this case, an oxidizing agent is required in both the steps. By contrast, the aqueous medium having a surface tension of not more than 50 mN/m can be easily penetrated into aggregates of carbon black, and, as a result, the carbon black can be easily size reduced. This can eliminate the need to use any oxidizing agent at the time of size reduction. Therefore, in the oxidation treatment of the carbon black, the oxidizing agent is used in only the step of oxidizing the size reduced carbon black. In this case, the ratio of the amount of the oxidizing agent used to the amount of the hydrophilic functional group is substantially 1:1. This facilitates the regulation of the hydrophilic functional group content/specific surface area value of the surface-modified carbon black, for example, to a range of 5 to 30 $\mu mol/m^2$. Further, since the oxidizing agent is used in only the step of oxidation, the total amount of the oxidizing agent can be reduced and, thus, the contemplated aqueous pigment dispersion can be produced at relatively low cost.

In the production process of an aqueous pigment dispersion according to the present invention, water serves as a main solvent in an aqueous medium. Water may be pure water obtained by ion exchange, ultrafiltration, reverse osmosis, distillation or the like, or ultrapure water. Further, water, which has been sterilized by ultraviolet irradiation or by addition of hydrogen peroxide or the like, is suitable because, when the aqueous pigment dispersion is stored for a long period of time, it can prevent the growth of mold or bacteria. According to the present invention, the aqueous medium may contain water as the main solvent and, in addition, a water-soluble organic solvent or a surfactant, for example, those described below.

In the production process of an aqueous pigment dispersion according to the present invention, a water-soluble organic solvent or a surfactant, which can bring the aqueous medium to low surface tension, can be added to bring the surface tension of the aqueous medium to not more than 50 mN/m in the step of grinding (size reduction).

For example, lower alcohols, such as ethanol and propanol, cellosolves, such as ethylene glycol monomethyl ether and ethylene glycol monoethyl ether, carbitols, such as diethylene glycol monomethyl ether and diethylene glycol monoethyl ether, or surfactants, such as nonionic, anionic, or cationic surfactants, may be added to water to regulate the surface tension of the aqueous medium at the temperature used in the step of grinding to not more than 50 mN/m. Here it should be noted that the surfactant is used only for the purpose of promoting the penetration of the aqueous medium into aggregates of the carbon black. More specifically, in general, the surfactant used for imparting the dispersibility to a pigment should be such that the surfactant and the pigment are adsorbed on each other. By contrast, according to the present invention, the consideration of the penetration only suffices for contemplated results, and any combination of the surfactant and the pigment, which are not adsorbed on each other, may be utilized.

The production process of an aqueous pigment dispersion according to the present invention involves the step of oxidizing the above carbon black in an aqueous medium to introduce hydrophilic functional groups into the carbon black to produce an aqueous pigment dispersion containing a surface-modified carbon black.

According to the present invention, the carbon black may be oxidized by conventional oxidation treatment. Specifically, for example, oxidation methods usable herein include a method wherein nitric acid, ozone, aqueous hydrogen peroxide, nitrogen oxide, hypohalolite or the like is used as the oxidizing agent under wet or dry conditions, and a method using plasma treatment.

According to a preferred embodiment of the present invention, the oxidation of the carbon black is carried out using a hypohalogenous acid and/or its salt. Examples of hypohalogenous acids or salts thereof usable herein include sodium hypochlorite, potassium hypochlorite, sodium hypobromite, and potassium hypobromite. Among them, sodium hypochlorite is preferred from the viewpoint of reactivity and cost.

Accordingly, the surface-modified carbon black according to the present invention is preferably one produced by oxidizing carbon black with a hypohalogenous acid and/or a salt thereof.

According to the production process of an aqueous pigment dispersion according to the present invention, preferably, the ratio of the amount of the carbon black to the amount of the oxidizing agent, grinding and/or oxidation time and the like are regulated from the viewpoint of regulating the hydrophilic functional group content/specific surface area value of the surface-modified carbon black contained in the aqueous pigment dispersion to 5 to 30 $\mu mol/m^2$. For example, when the treatment of acidic carbon black with sodium hypochlorite as the oxidizing agent is contemplated, the carbon black may be stirred in the presence of sodium hypochlorite in an amount of 5 to 20 times the amount of the starting carbon black at 95 to 105° C. for 10 to 15 hr, thereby preparing the contemplated surface-modified carbon black.

When the oxidation is carried out using a hypohalogeneous acid or a salt thereof, for example, carbon black and a hypohalite (for example, sodium hypochlorite) having an available halogen content of 10 to 30% are charged into a suitable amount of water, followed by stirring at 50° C. or above, preferably 95 to 150° C., for not less than 5 hr, preferably about 10 to 15 hr, thereby oxidizing the carbon black. In this case, preferably, the carbon black is ground before the reaction or ground simultaneously with the reaction. Methods for grinding carbon black usable herein include grinding by means of a ball mill, an attritor, a colloid mill, or a sand mill using glass, zirconia, alumina, stainless steel, or magnetic beads. When the carbon black is easily crumbled, carbon black may be size reduced by a rotary homogenizer or an ultrasonic homogenizer.

After the carbon black is ground and oxidized, the beads and coarse particles are separated and removed from the liquid system. By-products and excess ions are then removed by ultrafiltration or the like to perform purification. Thus, an aqueous pigment dispersion is obtained. If necessary for example, concentration by a separation membrane or the like, filtration, for example, through a metallic filter or a membrane filter, or classification by centrifugation may be carried out. Further, neutralization with a hydroxide of an alkali metal salt or an amine may also be carried out.

Ink Composition

The water-base ink composition according to the present invention may be used in recording methods using an ink composition. Recording methods using an ink composition include, for example, an ink jet recording method, a recording method using writing utensils, such as pens, and other various printing methods. Accordingly, the water-base ink composition of the present invention may be preferably used in, for example, writing utensils, such as water-base pens, ink jet recording method, printing, stamps and other applications.

The water-base ink composition according to the present invention comprises at least the aqueous pigment dispersion described above. Since the water-base ink composition according to the present invention comprises at least the water-base pigment dispersion described above, high print density and good storage stability can be realized.

The content of the surface-modified carbon black in the water-base ink composition according to the present invention is preferably 1 to 15% by weight, more preferably 2 to 10% by weight, based on the ink composition. The presence of the surface-modified carbon black in the above content range in the ink composition is advantageous in that ink compositions having viscosity usable in the ink jet recording method can be provided while ensuring satisfactory print density.

In the water-base ink composition according to the present invention, water is preferably used as a main solvent. Water may be pure water obtained by ion exchange, ultrafiltration, reverse osmosis, distillation or the like, or ultrapure water. Further, water, which has been sterilized by ultraviolet irradiation or by addition of hydrogen peroxide or the like, is suitable because, when the water-base ink composition is stored for a long period of time, it can prevent the growth of mold or bacteria.

According to a preferred embodiment of the present invention, the water-base ink composition contains the aqueous pigment dispersion described above, and, preferably, has a penetrability such that, when the coverage of the ink composition on a recording medium is 1 mg/cm$^2$, the penetration time of the ink composition is less than one sec.

In the present invention, "a penetrability such that, when the coverage of the ink composition on a recording medium is 1 mg/cm$^2$, the penetration time of the ink is less than one sec" specifically means that, when 50 ng of the ink composition is coated onto a plain paper, for example, in an area of 360 dpi (dots/inch)×360 dpi, the time necessary for the print face to dry to touch is less than one sec. In this case, a neutral plain paper, for example, Xerox P (tradename; manufactured by Fuji Xerox Co., Ltd.), is used as the plain paper.

In order to provide the penetrability of the ink composition, penetration accelerators, such as water-soluble organic solvents capable of lowering the surface tension of an aqueous solution or surfactants, may be added to the ink composition to improve the capability of wetting recording media.

Examples of water-soluble organic solvents usable for this purpose include: lower alcohols, such as ethanol and propanol; cellosolves, such as ethylene glycol monomethyl ether and ethylene glycol monoethyl ether; carbitols, such as diethylene glycol monomethyl a ether and diethylene glycol monoethyl ether; and 1,2-alkyldiols, such as 1,2-hexanediol and 1,2-octanediol.

According to a further preferred embodiment of the present invention, the water-soluble organic solvent used as the penetration accelerator is more preferably a glycol butyl ether water-soluble organic solvent. Glycol butyl ether water-soluble organic solvents usable herein include, for example, ethylene glycol mono-n-butyl ether, diethylene glycol n-butyl ether, and triethylene glycol n-butyl ether. The combination of the water-soluble organic solvent with the surface-modified carbon black can reduce feathering or bleeding at the time of printing and thus can provide good prints.

Surfactants usable herein include, for example, anionic surfactants, such as fatty acid salts and alkylsulfuric acid ester salts, nonionic surfactants, such as polyoxyethylene alkyl ethers and polyoxyethylene phenyl ether, cationic surfactants, and amphoteric surfactants.

More preferred surfactants include nonionic surfactants, such as polyoxyethylene alkyl ethers and polyoxyethylene phenyl ethers. These surfactants are advantageous over the ionic surfactants in that foaming of the ink can be reduced. Specific examples of such onionic surfactants include Nissan Nonion K-211, K-220, P-213, E-215, E-220, S-215, S-220, HS-220, NS-212, and NS-220 (tradenames; manufactured by Nippon Oils & Fats Co., Ltd.). More preferred surfactants include, for example, acetylene glycol surfactants among the nonionic surfactants, and examples of acetylene glycol surfactants include Surfynol 61, 82, 104, 440, 465, and 485 (tradenames; manufactured by Air Products and Chemicals, Inc.). They, when added to ink composition, can substantially completely prevent foaming, and thus is particularly suitable in the case where the ink composition is used in ink jet recording.

It should be noted that, since the surface-modified carbon black according to the present invention is dispersible and/or dissolvable in water without the aid of any dispersant, such as a surfactant, the surfactant used in the ink composition according to the present invention may be selected only for the purpose of attaining penetration acceleration effect. Specifically, in general, in order to impart dispersibility to a pigment, selection of a combination should be done so that the pigment and each material are adsorbed on each other.

By contrast, according to the present invention, the surfactant can be selected by taking into consideration only the penetration acceleration effect without the need to take the above combination into consideration.

According to the present invention, preferably, the water-soluble organic solvents or surfactants are used alone or in combination of two or more as the penetration accelerator to regulate the surface tension of the ink composition to less than 40 mN/m, preferably less than 35 mN/m.

When the water-base ink composition according to the present invention is used in ink jet recording, the ink composition may further contain a humectant from the viewpoint of preventing ink from drying at the front end of ink ejection nozzles.

The humectant is generally selected from water-soluble and highly hygroscopic materials. Specific examples of such humectants include, for example, polyols, such as glycerin, ethylene glycol, diethylene glycol, triethylene glycol, polyethylene glycol, propylene glycol, dipropylene glycol, polypropylene glycol, 1,3-propanediol, 1,4-butanediol, 1,5-pentanediol, 1,6-hexanediol, 1,2,6-hexanetriol, and pentaerythritol; lactams, such as 2-pyrrolidone, N-methyl-2-pyrrolidone, and ε-caprolactam; ureas, such as urea, thiourea, ethyleneurea, and 1,3-dimethylimidazolidinones; and saccharides, such as maltitol, sorbitol, gluconic lactone, and maltose.

These humectants may be added, to the ink composition according to the present invention, in such an amount that, when they are used in combination with other additives for ink, the viscosity of the ink composition can be brought to not more than 25 mPa·s at 25° C.

If necessary, the water-base ink composition according to the present invention may further contain fixing agents, pH adjustors, antioxidants, ultraviolet absorbers, preservatives, antimold and the like.

Water-soluble resins may be used as the fixing agent. Examples of such fixing agents include water-soluble rosins, alginic acids, polyvinyl alcohol, hydroxypropylcellulose, carboxymethylcellulose, hydroxyethylcellulose, methylcellulose, styrene/acrylic acid resins, styrene/acrylic acid/acrylic ester resin, styrene/maleic acid resin, styrene/maleic acid semi-ester resin, acrylic aid/acrylic ester resin, isobutylene/maleic acid resin, rosin-modified maleic acid resin, polyvinylpyrrolidone, gum arabic, starch, polyallylamine, polyvinylamine, and polyethyleneimine. It should be noted that, since the surface-modified carbon black according to the present invention is a colorant which is dispersible and/or dissolvable in water without the aid of any dispersant comprising a water-soluble resin, the water-soluble resin used in the ink composition according to the present invention may be selected only for the purpose of attaining fixation effect. Specifically, in general, in order to impart dispersibility to a pigment, selection of a combination should be done so that the pigment and each material are adsorbed on each other. By contrast, according to the present invention, the water-soluble resin can be selected by taking into consideration only the fixation without the need to take the above combination into consideration.

pH adjustors usable herein include, for example, hydroxides of alkali metals and amines, such as lithium hydroxide, sodium hydroxide, potassium hydroxide, triethanolamine, and diethanolamine.

Examples of antioxidants and ultraviolet absorbers include: allophanates, such as allophanate and methyl allophanate; biuret compounds, such as biuret, dimethylbiuret, and tetramethylbiuret; L-ascorbic acid and salts thereof; and Tinuvin 328, 900, 1130, 384, 292, 123, 144, 622, 770, and 292, Irgacor 252 and 153, and Irganox 1010, 1076, 1035, and MD1024, manufactured by Ciba-Geigy; and lanthanide oxides. For example, sodium benzoate, pentachlorophenol sodium, 2-pyridinethiol-1-oxide sodium, sodium sorbate, sodium dehydroacetate, and 1,2-dibenzothiazoline-3-one (Proxel CRL, Proxel BDN, Proxel GXL, Proxel XL-2, and Proxel TN, manufactured by ICI) may be used as preservatives or antimold in the ink composition of the present invention.

Although the water-base ink composition according to the present invention may be used in general writing utensil applications or printing applications and stamp applications, the water-base ink composition may be more suitable for use as an ink composition for ink jet recording wherein droplets of the ink composition are ejected and deposited onto a recording medium to perform printing. When the water-base ink composition according to the present invention is used as an ink for ink jet recording, the viscosity at 25° C. is preferably in the range of 1.0 to 15 mPa·s. This is because, when the viscosity of the ink composition is in the above viscosity range, the ink can be stably ejected in the ink jet recording.

Recording Method

The ink composition according to the present invention may be used in a recording method wherein the ink composition is deposited onto a recording medium to perform printing.

According to a further embodiment of the present invention, there is provided an ink jet recording method comprising the steps of: ejecting droplets of an ink composition according to the present invention; and depositing the droplets onto a recording medium to perform printing. In the ink jet recording method according to the present invention, any method may be used so far as the ink composition is ejected, through fine nozzles, as droplets which are then deposited onto a recording medium. Specific embodiments thereof will be described.

One of them, for example, is a static electricity-driven method. In this method, a strong electric field is applied between nozzles and accelerating electrodes disposed in the front of the nozzles to continuously eject the ink as droplets through nozzles. During a period in which, after ejection, the ink droplets are located between the deflecting electrodes, a printing information signal is sent to the deflecting electrodes to perform recording. Alternatively, in this method, if necessary, ejection may be carried out in response to the print information signal without deflecting the ink droplets. According to another embodiment, a pressure is applied to an ink composition by means of a miniature pump, and nozzles are mechanically vibrated by means of a quartz oscillator or the like to forcibly eject ink droplets. According to this embodiment, at the same time that the ink droplets are ejected, the ink droplets are electrified, and during a period in which, after ejection, the ink droplets are located between the deflecting electrodes, a printing information signal is sent to the deflecting electrodes to perform recording. According to still another embodiment, a piezoelectric element is used. In this case, a pressure and a printing information signal are simultaneously applied to an ink composition by means of a piezoelectric element to eject ink droplets, thereby performing recording. According to a further embodiment, the volume of the ink composition is rapidly increased through the action of thermal energy. In this case, bubbles of the ink composition are thermally formed in response to a printing information signal by means of microelectrodes to eject ink droplets, thereby performing recording. According to the ink jet recording method of the present invention, ink jet recording may be stably carried out.

According to a further aspect of the present invention, records produced by these recording methods are also provided. When the water-base ink composition according to the present invention is used in the formation of these records, the records have high print density and, at the same time, have high waterfastness, weathering resistance, active gas resistance and other properties.

EXAMPLES

The present invention will be described in more detail with reference to the following examples, though it is not limited to these examples only.

Preparation of Aqueous Pigment Dispersion

Aqueous pigment dispersion 1

Color Black FW 18 (tradename; manufactured by Degussa) (specific surface area 260 $m^2/g$), which is a commercially available acidic carbon black, was mixed in an amount of 100 g with 500 g of water. The mixture was ball milled using zirconia beads. Sodium hypochlorite (1,500 g) (available chlorine 12%) was added dropwise to the resultant milled stock liquid, and the mixture was boiled for 10 hr to conduct wet oxidation. The resultant stock dispersion was filtered through a glass fiber filter GA-100 (tradename; manufactured by Advantec Toyo Kaisha Ltd.), and then washed with water. The wet cake thus obtained was redispersed in 5 kg of water. The dispersion was desalted and purified through a reverse osmosis membrane to an electrical conductivity of 2 mS/cm, and further concentrated to a pigment concentration of 10% by weight to prepare an aqueous pigment dispersion 1.

The hydrophilic functional group content of the surface-modified carbon black thus obtained was determined by the vacuum pyrolysis gas method described above, and found to be 2,340 $\mu$mol/g, and the value obtained by dividing this hydrophilic functional group content value by the specific surface area of Color Black FW 18, that is, hydrophilic functional group content/specific surface area value, was 9.0 $\mu$mol/$m^2$.

Aqueous pigment dispersion 2

Color Black S 170 (tradename; manufactured by Degussa) (specific surface area 200 $m^2/g$), which is a commercially available acidic carbon black, was mixed in an amount of 100 g with 1 kg of water. The mixture was ball milled using zirconia beads. Sodium hypochlorite (1,400 g) (available chlorine 12%) was added dropwise to the resultant milled stock liquid, a reaction was allowed to proceed while ball milling for 5 hr, and the system was further boiled with stirring for 4 hr to conduct wet oxidation. The resultant stock dispersion was filtered through a glass fiber filter GA-100 (tradename; manufactured by Advantec Toyo Kaisha Ltd.), and then washed with water. The wet cake thus obtained was redispersed in 5 kg of water. The dispersion was desalted and purified through a reverse osmosis membrane to an electrical conductivity of 2 mS/cm, and further concentrated to a pigment concentration of 10% by weight to prepare an aqueous pigment dispersion 2.

The hydrophilic functional group content of the surface-modified carbon black thus obtained was determined by the method described above, and found to be 2,100 $\mu$mol/g, and the value obtained by dividing this hydrophilic functional group content value by the specific surface area of Color Black S 170 was 10.5 $\mu$mol/$m^2$.

Agueous pigment dispersion 3

MA 8 (tradename; manufactured by Mitsubishi Chemical Corporation) (specific surface area 137 $m^2/g$), which is a commercially available acidic carbon black, was mixed in an amount of 100 g with 500 g of water. The mixture was ball milled using zirconia beads. Sodium hypochlorite (500 g) (available chlorine 12%) was added dropwise to the resultant milled stock liquid, and the mixture was boiled for 10 hr to conduct wet oxidation. The resultant stock dispersion was filtered through a glass fiber filter GA-100 (tradename; manufactured by Advantec Toyo Kaisha Ltd.), and then washed with water. The wet cake thus obtained was redispersed in 5 kg of water. The dispersion was desalted and purified through a reverse osmosis membrane to an electrical conductivity of 2 mS/cm, and further concentrated to a pigment concentration of 10% by weight to prepare an aqueous pigment dispersion 3.

The hydrophilic functional group content of the surface-modified carbon black thus obtained was determined by the method described above, and found to be 1,230 $\mu$mol/g, and the value obtained by dividing this hydrophilic functional group content value by the specific surface area of MA 8 was 9.0 $\mu$mol/$m^2$.

Aqueous pigment dispersion 4

Color Black FW 200 (tradename; manufactured by Degussa) (specific surface area 460 $m^2/g$), which is a commercially available channel carbon black, was mixed in an amount of 100 g with 500 g of water. The mixture was ball milled using zirconia beads. Sodium hypochlorite (1,000 g) (available chlorine 12%) was added dropwise to the resultant milled stock liquid, and the mixture was boiled for 10 hr to conduct wet oxidation. The resultant stock dispersion was filtered through a glass fiber filter GA-100 (tradename; manufactured by Advantec Toyo Kaisha Ltd.), and then washed with water. The wet cake thus obtained was redispersed in 5 kg of water. The dispersion was desalted and purified through a reverse osmosis membrane to an electrical conductivity of 2 mS/cm, and further concentrated to a pigment concentration of 10% by weight to prepare an aqueous pigment dispersion 4.

The hydrophilic functional group content of the surface-modified carbon black thus obtained was determined by the method described above, and found to be 2,600 $\mu$mol/g, and the value obtained by dividing this hydrophilic functional group content value by the specific surface area of FW 200 was 5.7 $\mu$mol/$m^2$.

Aqueous pigment dispersion 5

Special Black 4 (tradename; manufactured by Degussa) (specific surface area 180 $m^2/g$), which is a commercially available channel carbon black, was mixed in an amount of 100 g with 500 g of water. The mixture was ball milled using zirconia beads. Sodium hypochlorite (1,100 g) (available chlorine 12%) was added dropwise to the resultant milled stock liquid, and the mixture was boiled for 10 hr to conduct wet oxidation. The resultant stock dispersion was filtered through a glass fiber filter GA-100 (tradename; manufactured by Advantec Toyo Kaisha Ltd.), and then washed with water. The wet cake thus obtained was redispersed in 5 kg of water. The dispersion was desalted and purified through a reverse osmosis membrane to an electrical conductivity of 2 mS/cm, and further concentrated to a pigment concentration of 10% by weight to prepare an aqueous pigment dispersion 5.

The hydrophilic functional group content of the surface-modified carbon black thus obtained was determined by the method described above, and found to be 2,500 $\mu$mol/g, and the value obtained by dividing this hydrophilic functional group content value by the specific surface area of Special Black 4 was 13.9 $\mu$mol/$m^2$.

Aqueous pigment dispersion 6 (comparative example)

Color Black FW 18, which is the acidic carbon black described above in connection with the aqueous pigment dispersion 1, was added in an amount of 5 g to 95 g of water, and the mixture was thoroughly stirred by means of a homomixer, followed by standing for several min. As a result, carbon black coagulated and settled.

The hydrophilic functional group content of the treated carbon black thus obtained was determined by the method described above, and found to be 130 $\mu$mol/g, and the value obtained by dividing this hydrophilic functional group content value by the specific surface area of Color Black FW 18 was 0.50 $\mu$mol/m$^2$.

Aqueous pigment dispersion 7 (comparative example)

Color Black S 170, which is the acidic carbon black described above in connection with the aqueous pigment dispersion 2, was mixed in an amount of 100 g with 500 g of water. The mixture was ball milled using zirconia beads. Sodium hypochlorite (350 g) (available chlorine 12%) was added dropwise to the resultant milled stock liquid, and the mixture was boiled for 10 hr to conduct wet oxidation. The resultant stock dispersion was filtered through a glass fiber filter GA-100 (tradename; manufactured by Advantec Toyo Kaisha Ltd.), and then washed with water. The wet cake thus obtained was redispersed in 5 kg of water. The dispersion was desalted and purified through a reverse osmosis membrane to an electrical conductivity of 2 mS/cm, and further concentrated to a pigment concentration of 10% by weight to prepare an aqueous pigment dispersion 7.

The hydrophilic functional group content of the surface-modified carbon black thus obtained was determined by the method described above, and found to be 960 $\mu$mol/g, and the value obtained by dividing this hydrophilic functional group content value by the specific surface area of Color Black S 170 was 4.80 $\mu$mol/m$^2$.

Aqueous pigment dispersion 8 (comparative example)

MA 8, which is the acidic carbon black described above in connection with the aqueous pigment dispersion 3, was mixed in an amount of 100 g with 500 g of water. The mixture was ball milled using zirconia beads. Sodium hypochlorite (70 g) (available chlorine 12%) was added dropwise to the resultant milled stock liquid, and the mixture was boiled for 6 hr to conduct wet oxidation. The resultant stock dispersion was filtered through a glass fiber filter GA-100 (tradename; manufactured by Advantec Toyo Kaisha Ltd.), and then washed with water. The wet cake thus obtained was redispersed in 5 kg of water. The dispersion was desalted and purified through a reverse osmosis membrane to an electrical conductivity of 2 mS/cm, and further concentrated to a pigment concentration of 10% by weight to prepare an aqueous pigment dispersion 8.

The hydrophilic functional group content of the surface-modified carbon black thus obtained was determined by the method described above, and found to be 620 $\mu$mol/g, and the value obtained by dividing this hydrophilic functional group content value by the specific surface area of MA 8 was 4.53 $\mu$mol/m$^2$.

Aqueous pigment dispersion 9 (comparative example)

Color Black FW 18, which is the acidic carbon black described above in connection with the aqueous pigment dispersion 1, was mixed in an amount of 100 g with 500 g of water. The mixture was ball milled using zirconia beads. Sodium hypochlorite (3,840 g) (available chlorine 12%) was added dropwise to the resultant milled stock liquid, and the mixture was boiled for 10 hr to conduct wet oxidation. The resultant stock dispersion was filtered through a glass fiber filter GA-100 (tradename; manufactured by Advantec Toyo Kaisha Ltd.), and then washed with water. The wet cake thus obtained was redispersed in 5 kg of water. The dispersion was desalted and purified through a reverse osmosis membrane to an electrical conductivity of 2 mS/cm, and further concentrated to a pigment concentration of 10% by weight to prepare an aqueous pigment dispersion 9.

The hydrophilic functional group content of the surface-modified carbon black thus obtained was determined by the method described above, and found to be 7,900 $\mu$mol/g, and the value obtained by dividing this hydrophilic functional group content value by the specific surface area of Color Black FW 18 was 30.38 $\mu$mol/m$^2$.

Aqueous pigment dispersion 10 (comparative example)

Color Black S 170, which is the acidic carbon black described above in connection with the aqueous pigment dispersion 2, was mixed in an amount of 100 g with 1 kg of water. The mixture was ball milled using zirconia beads. Sodium hypochlorite (2,420 g) (available chlorine 12%) was added dropwise to the resultant milled stock liquid, a reaction was allowed to proceed while ball milling for 5 hr, and the system was further boiled with stirring for 4 hr to conduct wet oxidation. The resultant stock dispersion was filtered through a glass fiber filter GA-100 (tradename; manufactured by Advantec Toyo Kaisha Ltd.), and then washed with water. The wet cake thus obtained was redispersed in 5 kg of water. The dispersion was desalted and purified through a reverse osmosis membrane to an electrical conductivity of 2 mS/cm, and further concentrated to a pigment concentration of 10% by weight to prepare an aqueous pigment dispersion 10.

The pigment dispersion thus obtained was rendered acidic by the addition of aqueous hydrochloric acid, and again purified by membrane purification, followed by concentration, drying, and pulverization to prepare a powder of an oxidized carbon black. The hydrophilic functional group content of the surface-modified carbon black thus obtained was determined by the method described above, and found to be 6,400 $\mu$mol/g, and the value obtained by dividing this hydrophilic functional group content value by the specific surface area of Color Black S 170 was 32.00 $\mu$mol/m$^2$.

Aqueous pigment dispersion 11 (comparative example)

MA 8, which is the acidic carbon black described above in connection with the aqueous pigment dispersion 3, was mixed in an amount of 100 g with 1 kg of water. The mixture was ball milled using zirconia beads. Sodium hypochlorite (870 g) (available chlorine 12%) was added dropwise to the resultant milled stock liquid, a reaction was allowed to proceed while ball milling for 5 hr, and the system was further boiled with stirring for 4 hr to conduct wet oxidation. The resultant stock dispersion was filtered through a glass fiber filter GA-100 (tradename; manufactured by Advantec Toyo Kaisha Ltd.), and then washed with water. The wet cake thus obtained was redispersed in 5 kg of water. The dispersion was desalted and purified through a reverse osmosis membrane to an electrical conductivity of 2 mS/cm, and further concentrated to a pigment concentration of 10% by weight to prepare an aqueous pigment dispersion 11.

The pigment dispersion thus obtained was rendered acidic by the addition of aqueous hydrochloric acid, and again purified by membrane purification, followed by concentration, drying, and pulverization to prepare a powder of an oxidized carbon black. The hydrophilic functional group content of the oxidized carbon black thus obtained was determined by the method described above, and found to be 4,320 $\mu$mol/g, and the value obtained by dividing this hydrophilic functional group content value by the specific surface area of MA 8 was 31.53 $\mu$mol/m$^2$.

Aqueous pigment dispersion 12 (comparative example)

Color Black FW 200 (100 g), which is the channel carbon black described above in connection with the aqueous pigment dispersion 4, 150 g of Joncryl J-62 (tradename; manufactured by Johnson Polymer Corp.) as a dispersant for a water-soluble resin, 6 g of sodium hydroxide, and 250 g of water were mixed together. The mixture was dispersed by means of a ball mill using zirconia beads for 10 hr. The stock dispersion thus obtained was filtered through a stainless steel filter having a pore diameter of about 5 µm, followed by dilution with water to a pigment concentration of 10% by weight to prepare an aqueous pigment dispersion 12 with the pigment being dispersed with the aid of a water-soluble resin.

Preparation of Water-base Ink Composition a

Water-base ink composition 1a

The aqueous pigment dispersion 1 (20 g), 5 g of glycerin and 5 g of 2-pyrrolidone as humectants, and 4 g of ethanol as a penetration accelerator were mixed together. Ultrapure water was added to the mixture to bring the total amount of the mixed solution to 100 g. The mixed solution was stirred for 2 hr, and then filtered through a stainless steel filter having a pore diameter of about 5 µm to prepare a water-base ink composition 1a.

Water-base ink composition 2a

The aqueous pigment dispersion 2 (20 g), 6 g of triethylene glycol and 5 g of urea as humectants, and 4 g of ethanol as a penetration accelerator were mixed together. Ultrapure water was added to the mixture to bring the total amount of the mixed solution to 100 g. The mixed solution was stirred for 2 hr, and then filtered through a stainless steel filter having a pore diameter of about 5 µm to prepare a water-base ink composition 2a.

Water-base ink composition 3a

A water-base ink composition 3a was prepared in the same manner as described above in connection with the preparation of the water-base ink composition 1a, except that the aqueous pigment dispersion 3 was used as the aqueous pigment dispersion.

Water-base ink composition 4a

A water-base ink composition 4a was prepared in the same manner as described above in connection with the preparation of the water-base ink composition 1a, except that the aqueous pigment dispersion 4 was used as the aqueous pigment dispersion.

Water-base ink composition 5a

Water-base ink composition 5a was prepared in the same manner as described above in connection with the preparation of the water-base ink composition 1a, except that; the aqueous pigment dispersion 5 was used as the aqueous pigment dispersion.

Water-base ink composition 6a (comparative example)

A water-base ink composition 6a was prepared in the same manner as described above in connection with the preparation of the water-base ink composition 1a, except that the aqueous pigment dispersion 6 was used as the aqueous pigment dispersion. The pigment in this ink, however, was not finely dispersed and, instead, rapidly settled immediately after the completion of stirring. This made it impossible to conduct filtration and subsequent evaluation.

Water-base ink composition 7a (comparative example)

A water-base ink composition 7a was prepared in the same manner as described above in connection with the preparation of the water-base ink composition 2a, except that the aqueous pigment dispersion 7 was used as the aqueous pigment dispersion.

Water-bade ink composition 8a (comparative example)

A water-base ink composition 8a was prepared in the same manner as described above in connection with the preparation of the water-base ink composition 1a, except that the aqueous pigment dispersion 8 was used as the aqueous pigment dispersion.

Water-base ink composition 9a (comparative example)

A water-base ink composition 9a was prepared in the same manner as described above in connection with the preparation of the water-base ink composition 1a, except that the aqueous pigment dispersion 9 was used as the aqueous pigment dispersion.

Water-base ink composition 10a (comparative example)

A water-base ink composition 10a was prepared in the same manner as described above in connection with the preparation of the water-base ink composition 2a, except that the aqueous pigment dispersion 10 was used as the aqueous pigment dispersion.

Water-base ink composition 11a (comparative example)

A water-base ink composition 11a was prepared in the same manner as described above in connection with the preparation of the water-base ink composition 1a, except that the aqueous pigment dispersion 11 was used as the aqueous pigment dispersion.

Water-base ink composition 12a (comparative example)

A water-base ink composition 12a was prepared in the same manner as described above in connection with the preparation of the water-base ink composition 2a, except that the aqueous pigment dispersion 12 was used as the aqueous pigment dispersion.

Preparation of Water-base Ink Composition b

Water-base ink composition 1b

The aqueous pigment dispersion 1 (45 g), 10 g of glycerin and 5 g of 2-pyrrolidone as humectants, and 4 g of tert-pentanol and 1 g of Nissan Nonion NS-220 (tradename; a nonionic surfactant, manufactured by Nippon Oils & Fats Co., Ltd.) as penetration accelerators were mixed together Ultrapure water was added to the mixture to bring the total amount of the mixed solution to 100 g. The mixed solution was adjusted to pH 7.5 by the addition of triethanolamine. The mixed solution was stirred for 2 hr. and then filtered through a stainless steel filter-having a pore diameter of about 5 µm to prepare a water-base ink composition 1b.

Water-base ink composition 2b

The aqueous pigment dispersion 2 (45 g), 10 g of glycerin and 5 g of diethylene glycol as humectants, and 7.5 g of diethylene glycol mono-n-butyl ether as a penetration accelerator were mixed together. Ultrapure water was added to the mixture to bring the total amount of the mixed solution to 100 g. The mixed solution was adjusted to pH 7.3 by the addition of triethanolamine. The mixed solution was stirred for 2 hr, and then filtered through a stainless steel filter having a pore diameter of about 5 µm to prepare a water-base ink composition 2b.

Water-base ink composition 3b

The aqueous pigment dispersion 3 (45 g), 10 g of glycerin and 5 g of diethylene glycol as humectants, and 5 g of diethylene glycol mono-n-butyl ether and Surfynol 104 (0.3 g) and Surfynol 485 (1.5 g) (acetylene glycol surfactants) as penetration accelerators were mixed together. Ultrapure water was added to the mixture to bring the total amount of the mixed solution to 100 g. The mixed solution was adjusted to pH 7.2 by the addition of triethanolamine. The mixed solution was stirred for 2 hr, and then filtered through a stainless steel filter having a pore diameter of about 5 µm to prepare a water-base ink composition 3b.

Water-base ink composition 4b

A water-base ink composition 4b was prepared in the same manner as described above in connection with the preparation of the water-base ink composition 1b, except that the aqueous pigment dispersion 4 was used as the aqueous pigment dispersion.

Water-base ink composition 5b

A water-base ink composition 5b was prepared in the same manner as described above in connection with the preparation of the water-base ink composition 3b, except that the aqueous pigment dispersion 5 was used as the dispersion.

Water-base ink composition 6b (comparative example)

A water-base ink composition 6b was prepared in the same manner as described above in connection with the preparation of the water-base ink composition 1b, except that the aqueous pigment dispersion 6 was used as the dispersion. The pigment in this ink, however, was not finely dispersed and, instead, rapidly settled immediately after the completion of stirring. This made it impossible to conduct filtration and subsequent evaluation.

Water-base ink composition 7b (comparative example)

A water-base ink composition 7b was prepared in the same manner as described above in connection with the preparation of the water-base ink composition 2b, except that the aqueous pigment dispersion 7 was used as the dispersion.

Water-base ink composition 8b (comparative example)

A water-base ink composition 8b was prepared in the same manner as described above in connection with the preparation of the water-base ink composition 3b, except that the aqueous pigment dispersion 8 was used as the dispersion.

Water-base ink composition 9b (comparative example)

A water-base ink composition 9b was prepared in the same manner as described above in connection with the preparation of the water-base ink composition 1b, except that the aqueous pigment dispersion 9 was used as the dispersion.

Water-base ink composition 10b (comparative example)

A water-base ink composition 10b was prepared in the same manner as described above in connection with the preparation of the water-base ink composition 2b, except that the aqueous pigment dispersion 10 was used as the dispersion.

Water-base ink composition 11b (comparative example)

A water-base ink composition 11b was prepared in the same manner as described above in connection with the preparation of the water-base ink composition 3b, except that the aqueous pigment dispersion 11 was used as the dispersion.

Water-base composition 12b (comparative example)

A water-base ink composition 12b was prepared in the same manner as described above in connection with the preparation of the water-base ink composition 1b, except that the aqueous pigment dispersion 12 was used as the dispersion.

Evaluation of pigment dispersions

A small amount of each of the aqueous pigment dispersions 1 to 12 was sampled, and observed under an optical microscope at a magnification of 400 times for the state of dispersion, that is, the presence of coagulate. The result as were evaluated according to the following criteria.

○: Coagulate was absent as observed at a magnification of 400 times, and the whole dispersion was homogeneous.

X: Coarse particles and coagulate were present.

Further, after standing for 1 hr, the aqueous pigment dispersions were observed under the optical microscope for coagulation. The results were evaluated according to the following criteria.

○: Coagulate did not form.

X: Coagulate formed, or otherwise the amount of coagulate increased.

Further, the aqueous pigment dispersions 1 to 12 were placed in hermetically sealed containers, and the containers were then allowed to stand at 50° C. for one month. Properties of the pigment dispersions after the standing were measured and compared with those before the standing to determine a change in properties of the pigment dispersions caused by the standing. The results were evaluated according to the following criteria.

○: A change of the viscosity and average particle diameter of the pigment dispersion after the standing was within ±50% of those before the standing.

X: Either a change of the viscosity or average particle diameter of the pigment dispersion after the standing was more than or equal to ±50% of those before the standing.

Furthermore, the pigment dispersions were coated on Xerox P (tradename; manufactured by Fuji Xerox Co., Ltd.) as a neutral plain paper by means of an applicator (coating thickness: 25 μm), and the coating was dried, followed by the measurement of OD value with a Macbeth densitomerter TR-927 (tradename; manufactured by Kollmorgen corporation).

The results were as summarized in Tables 1 and 2.

TABLE 1

| Aqueous pigment dispersion | 1 | 2 | 3 | 4 | 5 |
|---|---|---|---|---|---|
| Carbon black used | Color Black FW 18 | Color Black S 170 | MA 8 | Color Black FW 200 | Special Black 4 |
| Hydrophilic functional group content/specific surface area, μmol/m$^2$ | 9.0 | 10.5 | 9.0 | 5.7 | 13.9 |
| Coagulation | ○ | ○ | ○ | ○ | ○ |
| Coagulation after standing for 1 hr | ○ | ○ | ○ | ○ | ○ |
| Change in properties caused by standing at 50° C. | ○ | ○ | ○ | ○ | ○ |
| OD value | 1.56 | 1.55 | 1.48 | 1.54 | 1.52 |

TABLE 2

| Aqueous pigment dispersion | 6 | 7 | 8 | 9 | 10 | 11 | 12 |
|---|---|---|---|---|---|---|---|
| Carbon black used | Color Black FW 18 | Color Black S 170 | MA 8 | Color Black FW 18 | Color Black S 170 | MA 8 | Color Black FW 200 |
| Hydrophilic functional group content/specific surface area, $\mu mol/m^2$ | 0.5 | 4.8 | 4.5 | 30.4 | 32.0 | 31.5 | — |
| Coagulation | X | X | X | ○ | ○ | ○ | ○ |
| Coagulation after standing for 1 hr | — | X | X | ○ | ○ | ○ | ○ |
| Change in properties caused by standing at 50° C. | — | X | X | ○ | ○ | ○ | ○ |
| OD value | — | 1.56 | 1.48 | 1.35 | 1.32 | 1.30 | 1.32 |

Evaluation of Ink Composition A

Storage stability

The water-base ink compositions 1a to 12a were placed in hermetically sealed containers, and the containers were then allowed to stand at 50° C. for one month in this case, the viscosity and the average particle diameter of the water-base ink compositions were measured before and after the standing. The storage stability was evaluated according to the following criteria. The results were as summarized in Tables 3 and 4.

○: A change of the viscosity and average particle diameter of the ink composition after the standing was within ±20% of those before the standing.

X: Either a change of the viscosity or average particle, diameter of the ink composition after the standing was more than or equal to ±20% of those before the standing.

Print density

For the water-base ink compositions 1a to 12a, printing was carried out on Xerox P (tradename; manufactured by Fuji Xerox Co., Ltd.) as a neutral plain. paper by means of a piezoelectric on-demand ink jet recording apparatus. J-500 (trade name; manufactured by Seiko Epson Corporation) to prepare records. After drying, for the dried records, the print density (OD value) was measured with a Macbeth densitomerter TR-927 (tradename; manufactured by Kollmorgen corporation). The results were as summarized in Tables 3 and 4.

Evaluation of Ink Composition B

Storage stability

The water-base ink compositions 1b to 12b were placed in hermetically sealed containers, and the containers were then allowed to stand at 50° C. for one month. In this case, the viscosity and the average particle diameter of the water-base ink compositions were measured before and after the standing. The storage stability was evaluated according to the following criteria. The results were as summarized in Tables 5 and 6.

○: A change of the viscosity and average particle diameter of the ink composition after the standing was within ±20% of those before the standing.

X: Either a change of the viscosity or average particle diameter of the ink composition after the standing was more than or equal to ±20% of those before the standing.

Print density

For the water-base ink compositions 1b to 12b having a penetrability of less than one sec in terms of penetration time of the ink, printing was carried out on Xerox P (tradename; manufactured by Fuji Xerox Co., Ltd.) as a neutral plain paper by means of a piezoelectric on-demand ink jet recording apparatus MJ-930C (tradename; manufactured by Seiko Epson Corporation) to prepare records. After drying, for the dried records, the print density (OD value) was measured with a Macbeth densitomerter TR-927 (tradename; manufactured by Kollmorgen Corporation). The results were as summarized in-Tables 5 and 6.

TABLE 3

| Water-base ink composition | 1a | 2a | 3a | 4a | 5a |
|---|---|---|---|---|---|
| Pigment dispersion used | 1 | 2 | 3 | 4 | 5 |
| Carbon black used | Color Black FW 18 | Color Black S 170 | MA 8 | Color Black FW 200 | Special Black 4 |
| Hydrophilic functional group content/specific surface area, $\mu mol/m^2$ | 9.0 | 10.5 | 9.0 | 5.7 | 13.9 |
| Storage stability | ○ | ○ | ○ | ○ | ○ |
| OD value | 1.55 | 1.54 | 1.49 | 1.53 | 1.52 |

TABLE 4

| Water-base ink composition | 6a | 7a | 8a | 9a | 10a | 11a | 12a |
|---|---|---|---|---|---|---|---|
| Pigment dispersion used | 6 | 7 | 8 | 9 | 10 | 11 | 12 |
| Carbon black used | Color Black FW 18 | Color Black S 170 | MA 8 | Color Black FW 18 | Color Black S 170 | MA 8 | Color Black FW 200 |
| Hydrophilic functional group content/specific surface area, $\mu mol/m^2$ | 0.5 | 4.8 | 4.5 | 30.4 | 32.0 | 31.5 | — |
| Storage stability | — | X | X | ○ | ○ | ○ | ○ |
| OD value | — | 1.55 | 1.48 | 1.34 | 1.31 | 1.30 | 1.31 |

TABLE 5

| Water-base ink composition | 1b | 2b | 3b | 4b | 5b |
|---|---|---|---|---|---|
| Hydrophilic functional group content/specific surface area, $\mu mol/m^2$ | 9.0 | 10.5 | 9.0 | 5.7 | 13.9 |
| Storage stability | ○ | ○ | ○ | ○ | ○ |
| OD value | 1.47 | 1.46 | 1.43 | 1.48 | 1.44 |

TABLE 6

| Water-base ink composition | 6b | 7b | 8b | 9b | 10b | 11b | 12b |
|---|---|---|---|---|---|---|---|
| Hydrophilic functional group content/specific surface area, $\mu mol/m^2$ | 0.5 | 4.8 | 4.5 | 30.4 | 32.0 | 31.5 | — |
| Storage stability | — | X | X | ○ | ○ | ○ | ○ |
| OD value | — | 1.47 | 1.43 | 1.23 | 1.23 | 1.21 | 1.22 |

Print quality

For the records produced in the evaluation of the print density, the print quality was visually evaluated.

Records produced by printing using the ink composition 2b with a glycol butyl ether as a penetration accelerator added thereto suffered from no significant feathering in the periphery of the print and had particularly good print quality.

For the ink compositions 3b and 5b further containing an acetylene glycol nonionic surfactant as the penetration accelerator, the level of foaming was very low, and, thus, these ink compositions had excellent handleability.

What is claimed is:

1. An aqueous pigment dispersion comprising at least water and a surface-modified carbon black, the surface-modified carbon black being dispersible and/or dissolvable in water without any dispersant and having a hydrophilic functional group content/specific surface area value of 5 to 15 $\mu mol/m^2$.

2. The aqueous pigment dispersion according to claim 1, wherein the surface-modified carbon black has been produced by oxidizing an acidic carbon black.

3. The aqueous pigment dispersion according to claim 1, wherein the surface-modified carbon black has been produced by oxidizing a channel carbon black.

4. The aqueous pigment dispersion according to claim 1, wherein the surface-modified carbon black has been produced by oxidizing carbon black with a hypohalogenous acid or its acid.

5. The aqueous pigment dispersion according to claim 1, wherein the content of the hydrophilic functional groups in the surface-modified carbon black is not less than 1.5 mmol/g.

6. A process for producing the aqueous pigment dispersion according to claim 1, comprising the steps of:

grinding carbon black in an aqueous medium having a surface tension of not more than 50 mN/m; and oxidizing the carbon black in an aqueous medium to introduce hydrophilic functional groups into the carbon black to prepare an aqueous pigment dispersion containing a surface-modified carbon black.

7. The process according to claim 6, wherein the carbon black is oxidized with a hypohalogenous acid and/or its salt.

8. A water-base ink composition comprising at least the aqueous, pigment dispersion according to claim 1.

9. The water-base ink composition according to claim 8, which, when the amount of the ink composition deposited on a recording medium is 1 $mg/cm^2$, has a penetrability of less than one sec in terms of the penetration time of the ink composition.

10. The water-base ink composition according to claim 8, which has a surface tension of less than 40 mN/m.

11. The water-base ink composition according to claim 8, which further comprises a glycol butyl ether water-soluble organic solvent.

12. The water-base ink composition according to claim 8, which further comprises a nonionic surfactant.

13. The water-base ink composition according to claim 12, wherein the nonionic surfactant is an acetylene glycol surfactant.

14. The water-base ink composition according to claim 8, wherein the content of the surface-modified carbon black is 1 to 15% by weight based on the total amount of the ink.

15. A recording method comprising the step of depositing an ink composition onto a recording medium to perform printing, wherein the ink composition is the water-base ink composition according to claim 8.

16. An ink jet recording method comprising the steps of: ejecting droplets of an ink composition; and depositing the droplets onto a recording medium to perform printing, wherein the ink composition is the water-base ink composition according to claim 8.

17. A process for producing an aqueous pigment dispersion comprising at least water and a surface-modified carbon black, comprising the steps of:

grinding carbon black in an aqueous medium having a surface tension of not more than 50 mN/m; and oxidizing the carbon black in an aqueous medium to introduce hydrophilic functional groups into the carbon black to prepare an aqueous pigment dispersion containing a surface-modified carbon black.

18. The aqueous pigment dispersion according to claim 1, wherein the surface-modified carbon black has a hydrophilic functional group content/specific surface area value of 7.5 to 15 $\mu mol/m^2$.

* * * * *